July 12, 1966 W. R. BELKO, JR 3,260,196

METHOD AND APPARATUS FOR MAKING ELECTRICAL UNIT

Filed Nov. 21, 1961

INVENTOR.
William R. Belko, Jr.
BY
Johnson and Kline
ATTORNEYS

United States Patent Office 3,260,196
Patented July 12, 1966

3,260,196
METHOD AND APPARATUS FOR MAKING ELECTRICAL UNIT

William R. Belko, Jr., Huntington, Conn., assignor to Vitramon Incorporated, Monroe, Conn., a corporation of Delaware Filed Nov. 21, 1961, Ser. No. 153,970
4 Claims. (Cl. 101—129)

This invention relates to the manufacture of electrical units such as capacitors, resistors, inductors and combinations thereof or the like. More specifically, it pertains to a method and apparatus for forming patterns from material having specific electrical characteristics on a base member having other specific electrical characteristics.

It is necessary in the manufacture of certain types of electrical units to form a predetermined pattern of material having specific electrical characteristics on a base member having other specific electrical characteristics, the size, shape and location of the patterns being critical in obtaining the desired end product. For instance, in some types of capacitors the electrodes are provided by forming predetermined electrically conductive patterns on the opposite surfaces of a dielectric base member and in such constructions the capacitance of the unit is based not only on the dielectric constant of the base member and the distance between the electrodes but on the size, shape and relative location of the patterns forming the electrodes.

It will be understood that, where the size, shape and location of a formed pattern is critical to achieving the desired characteristics in an electrical unit, positive control over the formation of the pattern must be obtained.

Heretofore, many methods have been resorted to for forming patterns in a controlled manner. According to one known method, the surface on which the pattern is to be formed is pre-coated with the material of the pattern and then a portion of the coating is removed, as by etching or the like, to leave the desired pattern on the surface. In another method, the pattern is printed or similarly formed directly on the surface. While such prior methods are apparently successful, they have inherent disadvantages when applied in a production operation or to the task of forming a pattern on certain fragile or hard to handle materials. The removal of a portion of a coating to obtain a pattern is time consuming and expensive, since excessive handling and accurate timing is required, and, further, when such a method is performed on a production scale difficulty is encountered in maintaining simultaneous control over the size, shape and location of the pattern being formed. In the method of direct pattern forming, such as by printing or the like, particular problems are encountered when the surface on which the pattern is to be formed is of a fragile character, such as the thin film ceramic dielectric used in capacitors, since the pressure necessary to print the pattern often results in the cracking of the surface or base member.

Prior to this invention there have been attempts to overcome the problems of prior methods by masking the surface of the base member and then spraying or painting the material thereon, but such attempts have been unsuccessful due to difficulty in removing the mask, damage to the base member often resulting, and in adapting the masking procedure to production processes.

The present invention overcomes the problems aforenoted and has as an important object thereof to provide a method and apparatus for controlably forming a sharply defined pattern of material having specific electrical characteristics in a predetermined size and location on a base member having other specific electrical characteristics without the application of pressure sufficient to crack the base member and at a substantial reduction in time and expense.

According to the invention, this object is achieved by masking the surface of the base member with an adhesive means, of a character adapted to deform upon being treated for separting from the surface to which it is adhered and shaped to expose only a portion of the surface defining the predetermined pattern, and then coating the exposed portion of the surface with the desired material for the pattern. Thereafter, the adhesive masking means is treated for deforming and separating it from the base member so that only the formed pattern remains on the surface.

Another object of the invention is to provide a method for forming a predetermined pattern on a base member wherein an adhesive masking tape, shaped to expose a predetermined portion of a surface to which it is adhered and of a character adapted to deform upon treatment for separating from the surface to which it is applied, intermittently moves through a plurality of pattern forming stations and is adhered to a base member for exposing only a predetermined portion thereof and transporting the base member through the stations.

It is also an object of the invention to provide a method and apparatus for forming predetermined patterns on a base member wherein an intermittently moving adhesive tape, of a character adapted to deform upon treatment for separating from a surface to which it is applied, is adhered to a base member for masking the same to define at least one predetermined exposed pattern on the surface thereof and transport the base member through a coating station in which the exposed surface pattern is coated with the material desired for the pattern.

It is also an object of the invention to provide a method for forming a predetermined pattern of material having specific electrical characteristics on a base member having other specific electrical characteristics, wherein a masking means, shaped to expose only a predetermined portion of a surface to which it is adhered and of a character adapted to deform upon the application of heat for separating from a surface to which it is applied, is adhered in a predetermined manner to a base member for conveying the base member to a position at which the exposed portion of the surface is coated with the desired material.

It is further an object of the invention to provide an apparatus for forming a predetermined pattern of material having specific electrical characteristics on the surface of a base member having other specific electrical chartcteristics which includes a conveyor means for transporting the base member through a station at which the pattern material is applied to the surface, said conveyor means including a pressure sensitive adhesive tape, of a character adapted to deform upon treatment for separating from a surface to which it is adhered and shaped to expose only a predetermined portion of such surface, movable between a supply and take-up means through a plurality of stations.

It is still further an object of the invention to provide a method for forming a predetermined pattern of material on a base member including the steps of adhering an adhesive masking means, of a character adapted to deform upon treatment for separating from a surface to which it is adhered, to a surface of the base member for defining an exposed portion of such surface and then moving the masking means for transporting the base member to a position where the exposed portion of the surface is coated with the material.

Other objects and advantages of the invention will be apparent from the specification and claims when considered in connection with the attached sheet of drawings, illustrating one form of the invention, wherein like characters represent like parts and in which:

Figures 1, 2, 3, 4, 5:
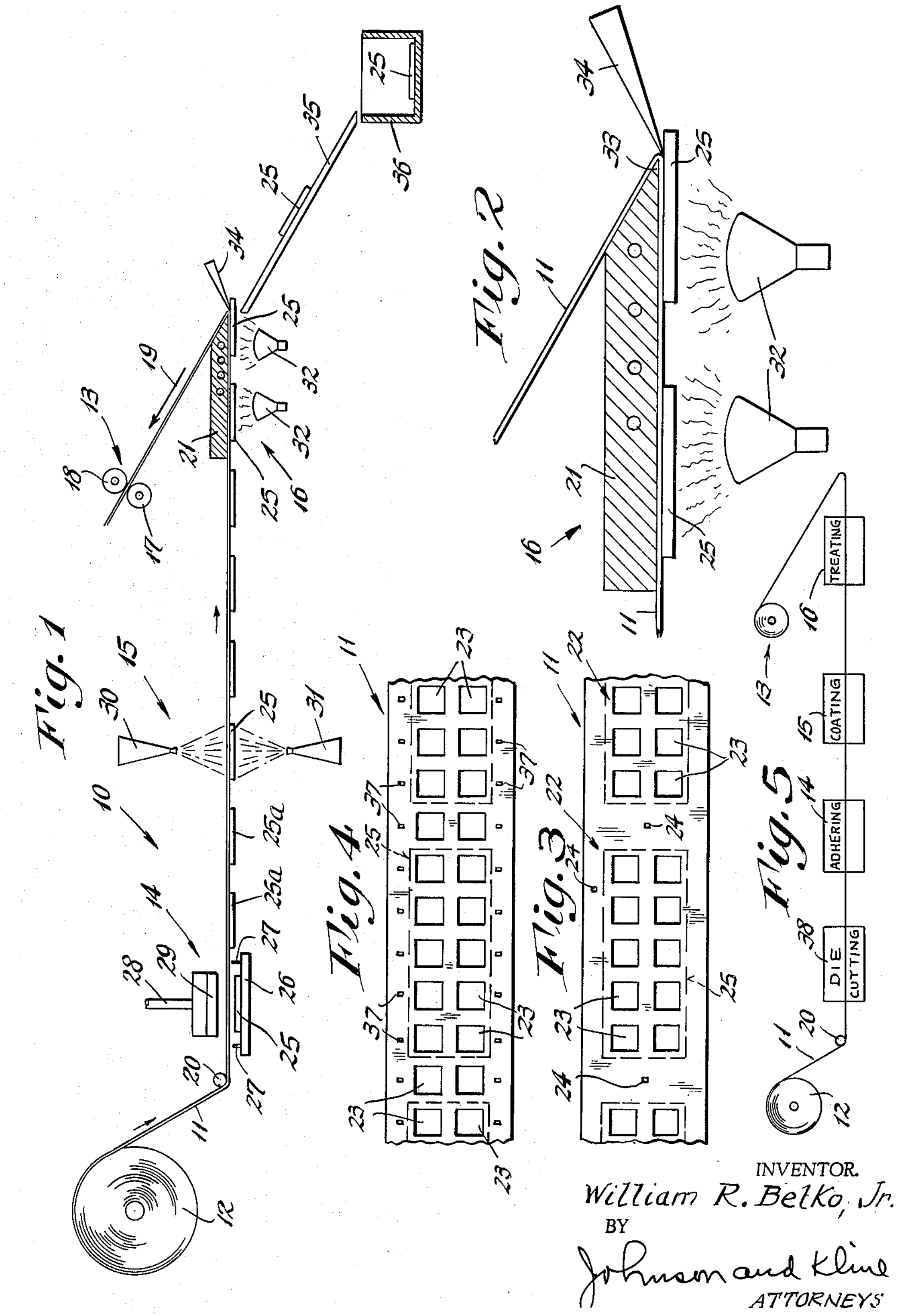
FIGURE 1 is a diagrammatic elevational view illustrating one form of apparatus embodying the invention.
FIG. 2 is an enlarged fragmentary view of the deforming and separating portion of the apparatus shown in FIG. 1.
FIG. 3 is a fragmentary plan view of one form of masking and conveyor means according to the invention.
FIG. 4 is a fragmentary plan view of another form of masking and conveyor means according to the invention.
FIG. 5 is a diagrammatic illustration of another form of apparatus embodying the invention.

According to the present invention, a pattern of material having specific electrical characteristics is formed in a predetermined size, shape and location on a base member by masking the surface of a base member with means, preferably a pressure sensitive adhesive tape, shaped to expose only a predetermined portion of the surface conforming to the desired pattern. The masking means, which is adhered to the surface of the base member and of a character adapted to deform upon treatment, as by the application of heat thereto, for separating from the surface to which it is adhered, is then moved to transport the base member into position for coating the exposed portion of the surface with the desired material. Thereafter, the exposed surface is coated by spraying, painting or applying the material in any other known manner and the masking means is treated to deform it and separate it from the base member.

Referring now to the drawings for a more detailed description of the invention, in FIGS. 1 and 2 an apparatus 10 is diagrammatically shown embodying the concepts of the invention. While the method and the apparatus of the invention are applicable to the manufacture of resistors, inductors or any other electrical unit in which a pattern of material is formed on a base member of electrically different material, in the illustrated embodiments of the invention reference is made to the manufacture of a capacitor to clarify the description.

As illustrated, the apparatus 10 includes a conveyor means 11 which is moved intermittently between a supply means 12 and take-up means 13 through a plurality of stations 14, 15 and 16. While movement may be imparted to the conveyor means in any known manner, in the illustrated form of the invention the take-up means 13 comprises a pair of pinch rolls 17 and 18 driven by a power source (not shown) for moving the conveyor in the direction of arrow 19. A guide roller 20 may be utilized in cooperation with a blade member 21, to be hereinafter more fully described, for controlling the path of travel of the conveyor means through the stations 14, 15 and 16.

According to the invention, the conveyor means 11, which is preferably a pressure sensitive adhesive tape and adapted to mask the surface of the base member on which the pattern is to be formed, must be of such a character that it will deform upon treatment for separating from the surface to which it has been adhered, so that, on completion of the pattern forming operations, removal of the mask from the surface is facilitated without stress on the base member. It will be understood that stress free mask removal is essential where the base member is a fragile body, such as the thin film ceramic dielectric used in the manufacture of capacitors. While any tape having the desired separating characteristics may be used without departing from the concepts of the invention, it is preferred to use a tape which will shrink upon the application of heat, for curling away from the surface and facilitating separation of the two. A tape of this type is commonly described as having "plastic memory" in that it is prestretched when it is formed and maintains the prestretched condition until heat is applied thereto at which time it shrinks. A tape of the desired characteristics is polyvinyl chloride tape, such as is manufactured by the Minnesota Mining & Manufacturing Company and is identified by them as lithographers tape No. 616.

The masking tape or conveyor 11, according to the form of the invention illustrated in FIG. 1, is preshaped so that on being adhered to the surface of a base member only a predetermined portion of the surface will be exposed, the remainder of the surface being masked by the tape. In preshaping the masking tape, which may be achieved by die cutting, punching or in any other manner known to the art, openings are formed therein, which correspond in size and shape to the pattern it is desired to form on the base member, and are positioned and spaced along the tape so that the intermittent movement of the tape will bring each pattern or pattern group successively into proper alignment with a base member during the travel of the tape between the supply and take-up means, as will be hereinafter more fully described. Referring now to FIG. 3, a section of masking tape is shown which has been preshaped according to the invention. As shown, a plurality of pattern groups 22 have been formed at predeterminately spaced intervals along the tape, each of the groups including a plurality of individual patterns 23 comprising openings in the tape. While the patterns may take any desired form or shape, in the illustrated form of the invention they comprise the electrode patterns of individual capacitor units. Each of the pattern groups have predeterminately spaced therearound index openings 24 which are adapted to be engaged by index pins, as will be hereinafter described, to assure alignment between the tape and base member when the former is adhered to the latter at one of the stations of the apparatus 10.

Referring again specifically to FIGS. 1 and 2, as the preshaped conveyor means 11 is moved between the supply means 12 and the take-up means 13 it passes through the operating stations 14, 15 and 16 of the apparatus and has its movement controlled so that such movement is interrupted to successively position at least one pattern group 22 operatively within each station. At station 14 the conveyor 11 is aligned with and adhered to a base member 25 so that one of the pattern groups 22 of the conveyor overlies a surface of the base member and masks the same in the desired manner. While such aligning and adhering may be achieved by any means known to the art, in the illustrated form of the invention a jig 26, which may be a vacuum chuck or the like, is provided for predeterminately positioning the base member 25 operatively adjacent the path of travel of masking tape 11. Index pins 27 are provided on the jig for engaging the index openings 24, formed around each of the pattern groups 22, so that the masking tape and base member are positively aligned during the adhering operation. While adhering may be accomplished by manually pressing the tape against the base member or by shifting the jig to press the base member into engagement with the tape, as shown, means in the form of a plunger 28 having a sponge rubber facing 29 are provided for pressing the tape against the base member. It will be readily understood that the plunger may be actuated by hand or by automatic means of any type commonly utilized.

After the masking tape has been adhered to the base member the tape is moved from station 14 into operative position in station 15 carrying the base member with it, as shown at 25*a*. Station 15 comprises the coating station of the apparatus or that station at which the material of the pattern is applied to the exposed surface of the base member. While coating may be accomplished by means of rollers, hand painting or any other known manner, it is herein illustrated as being achieved by spraying the material on the surface. As shown, a pair of opposed spraying devices 30 and 31 are positioned to spray the opposite surface of the base member, thus facilitating the rapid application of the patterns. The spraying devices 30 and 31, which are actuated manually or by photo electric control means or the like, may be used to simultaneously spray both sides of the base member, as would be the case where a specified pattern is desired on one surface of the base member while the other surface is to be completely coated with the pattern material, or they may be operated independently. This latter form of operation will be utilized when specified patterns are required to be formed on each surface of the base member and in this instance the base member will be run through the apparatus a second time for applying a pattern to the surface opposite the one that had been originally coated.

After the spraying operation has been completed the masking tape 11 is moved, still carrying the base member 25 with it, into a position operatively within station 16. At this station the tape is treated to deform it for facilitating the separation of the tape and base member. In the illustrated form of the invention, as previously discussed, the tape is of a character which deforms upon the application of heat thereto and accordingly station 16 comprises means for heating the tape to the temperature necessary to deform it. While any well known heat means may be utilized and the tape may be heated from one or both sides thereof, as shown a pair of heat lamps 32 cooperate with a heated blade member 21 to provide the necessary heat to deform the tape. Thereafter, movement of the tape and base members from station 16 result in the physical separation of the two, enabling the base members to be further treated, as in the instant case by firing and cutting into individual capacitor units, or be rerun through the apparatus for the formation of patterns on the opposite surface of the base member, as required.

Referring now to FIG. 2, it will be seen that physical separation of the tape and base members is achieved by moving the tape in substantially a reversed direction around the knife shaped edge 33 of the blade member 21 and engaging the base member by a stripper blade 34 which prevents the base member from sticking to the tape and moving with it toward the take-up means 13. Upon removal of the base member from the conveyor or tape 11 it is guided down a chute 35 into a receptacle 36, as shown, or onto other apparatus (not shown) for performing additional processing steps thereon.

It will be seen that the apparatus 10, herein above described, provides a control means for accurately forming a pattern of predetermined size, shape and location on the surface of a base member and that the timing of the movement of the conveyor, which also functions to mask the surface on which the pattern is to be formed, is essential to the operation of the apparatus for achieving the desired results.

At this point reference is made to FIG. 4 wherein another form of conveyor means or masking tape 11 is shown. In this form of the invention the individual pattern openings 23, which as above comprise the electrode patterns for a capacitor, are successively formed one after another along the tape and the tape is provided adjacent its opposed edges with sprocket holes 37 similar in form to the sprocket holes found on movie film or the like. It will be understood that when using this form of conveyor means the drive rolls 17 and 18 of take-up means 13 and the guide roller 20 may be formed with sprockets for engaging the sprocket holes 37 and controllably moving the conveyer through the apparatus.

In FIG. 5 another form of the invention is shown, similar to the apparatus of FIG. 1, but including a station 38 operatively preceding station 14 for die cutting or similarly forming the patterns in the conveyor means 11. This form of the invention differs from the apparatus of FIG. 1 in that it is not necessary to preshape the masking tape, thus eliminating the possibility of misalignment of the tape and base members during the operation of the apparatus and inaccuracies in the formed patterns. By die cutting or otherwise forming the patterns in the tape at a predeterminately located station in the apparatus and by accurately controlling the movement of the tape between the supply and take-up means and from station to station, accurate positioning of the patterns on the base members is obtained along with the accurate control over the size and shape of the patterns.

Thus, among others, the several objects and advantages of the invention as aforenoted are achieved. Obviously numerous changes in the structure may be resorted to without departing from the spirit of the invention as defined by the claims.

I claim:

1. The method of forming a predetermined pattern of material having specific electrical characteristics on a surface of a base member having other specific electrical characteristics comprising the steps of providing an adhesive masking means adapted to cover the surface of the base member and capable of deforming upon the application of heat thereto for separating from a surface to which it is applied, forming at least one opening in said masking means corresponding to the desired pattern, aligning the masking means and the base member and adhering the former to a surface of the latter, coating the surface of the base member exposed through the opening in the masking means with the material of said specific electrical characteristics for producing the predetermined pattern thereon, and applying heat to the masking means to deform the same and separate it from the base member.

2. The method of forming a predetermined pattern of material having specific electrical characteristics on a surface of a thin base member having other specific electrical characteristics comprising the steps of providing a pressure sensitive adhesive masking tape having a plurality of pattern groups predeterminately spaced therealong and capable of deforming upon the application of heat for separating from the surface to which it is applied, the pattern groups each including at least one opening in the tape corresponding to the pattern it is desired to form, moving the masking tape intermittently between a supply means and take-up means so that movement is predeterminately stopped to position each pattern group successively at each of a plurality of stations, positioning a base member in a predetermined manner at a first station for each successive pattern group so that the masking tape in stopped position is in covering relation with a surface of the base member and the pattern group is predeterminately positioned relative to the surface and then pressing the masking tape against the surface to adhere the same thereto so that the base member moves with the tape, coating the surface of the base member through the opening in the tape at a second station with material of said specific electrical characteristics for producing the predetermined pattern thereon, and applying heat to the masking tape at a subsequent station to deform the same and separate it from the base member.

3. The method of forming a predetermined pattern of electrically conductive material on the surface of a thin dielectric base member comprising the steps of providing a pressure sensitive adhesive masking tape having a plurality of pattern groups predeterminately spaced therealong and capable of deforming upon the application of heat for separating from the surface to which it is applied, the pattern groups each including at least one opening in the tape corresponding to the pattern it is desired to form, moving the masking tape intermittently between a supply means and take-up means so that movement is predeterminately stopped to position each pattern group successively at each of a plurality of stations, positioning a base member in a predetermined manner at a first station for each successive pattern group so that the masking tape in stopped position is in covering relation with a surface of the base member and the pattern group is predeterminately positioned relative to the surface and then pressing the masking tape against the surface to adhere the same thereto so that the base member moves with the tape, coating the surface of the base member through the opening in the tape at a second station with electrically conductive material for producing the predetermined pattern thereon, and applying heat to the masking tape at a subsequent station to deform the same and separate it from the base member.

4. The method of forming a predetermined pattern of material having specific electrical characteristics on a surface of a thin base member having other specific electrical characteristics comprising the steps of providing a prestretched adhesive masking means adapted to cover the surface of the base member and having the characteristic of plastic memory, forming an opening in said masking means corresponding to the desired pattern, aligning the masking means and the base member and adhering the former to a surface of the latter, coating the surface of the base member exposed through the opening in the masking means with material of said specific electrical characteristics for producing the predetermined pattern thereon, and applying heat to the masking means for shrinking the masking means away from the base member.

References Cited by the Examiner

UNITED STATES PATENTS

| | | | |
|---|---|---|---|
| 1,130,645 | 3/1915 | Stow | 101—129 |
| 1,162,886 | 12/1915 | Stow | 101—121 |
| 1,784,616 | 12/1930 | Van Bergen | 101—121 |
| 2,040,988 | 5/1936 | Gragg. | |
| 2,283,171 | 5/1942 | Batcheller. | |
| 2,401,220 | 5/1946 | Bonner | 101—129 |
| 2,475,434 | 7/1949 | Moss | 101—114 |
| 2,542,726 | 2/1951 | Sullivan. | |
| 2,783,193 | 2/1957 | Nieter. | |

FOREIGN PATENTS

| | | |
|---|---|---|
| 692,614 | 6/1953 | Great Britain. |

DAVID KLEIN, *Primary Examiner.*

ROBERT E. PULFREY, *Examiner.*

JANYCE A. BELL, *Assistant Examiner.*